US006817286B2

(12) United States Patent
Toto (10) Patent No.: US 6,817,286 B2
(45) Date of Patent: Nov. 16, 2004

(54) MUSHROOM COMPOST COMPACTING ASSEMBLY (76) Inventor: Remo Toto, 687 Oxford Rd., Lincoln University, PA (US) 19352

(*) Notice: Subject to any disclaimer, the term of this patent is extended or adjusted under 35 U.S.C. 154(b) by 0 days.

(21) Appl. No.: 10/624,982

(22) Filed: Jul. 21, 2003

(65) Prior Publication Data
US 2004/0065215 A1 Apr. 8, 2004

Related U.S. Application Data (63) Continuation-in-part of application No. 10/262,752, filed on Oct. 2, 2002, now abandoned.

(51) Int. Cl.[7] .............................. B30B 3/00; B65G 3/00
(52) U.S. Cl. ..................... 100/152; 100/153; 100/102; 100/188 R; 241/189.1; 414/272
(58) Field of Search ................................ 100/102, 152, 100/153, 188 R, 210, 146, 299; 241/DIG. 38, 189.1, 190; 414/272, 300, 343

(56) References Cited

U.S. PATENT DOCUMENTS

| 3,752,059 | A |   | 8/1973  | Boyer ........................ 100/37 |
|-----------|---|---|---------|---------------------------------------|
| 4,273,495 | A |   | 6/1981  | Pannell ....................... 414/272 |
| 4,371,305 | A |   | 2/1983  | Pannell ....................... 414/300 |
| 4,380,285 | A | * | 4/1983  | Burkner et al. ............ 198/533 |
| 4,717,307 | A |   | 1/1988  | Ciuffetelli .................... 414/300 |
| 5,256,378 | A |   | 10/1993 | Elston ....................... 435/290.2 |
| 5,582,572 | A |   | 12/1996 | Bianchi ....................... 588/252 |
| 5,863,476 | A |   | 1/1999  | Wier ........................... 264/72 |

* cited by examiner

Primary Examiner—Allen Ostrager
Assistant Examiner—Jimmy T Nguyen (57) ABSTRACT

A mushroom compost compacting assembly includes a feed hopper unit, a mixer unit, a conveyor unit and a compactor unit all of which are separate and distinct from each other. The units are detachably connected to each other so that the units could be assembled at the mushroom house itself adjacent to the mushroom beds. Compost would be fed to the hopper unit and then to the mixer unit which would spread the compost and feed some of the compost to the conveyor unit with the remaining compost being fed to the compactor unit. The compactor unit includes a series of compactor drums for compacting the compost. The compost fed into the conveyor unit would be discharged directly on the netting of a mushroom bed while the compacted compost from the compactor unit would be delivered to the mushroom bed directly on the compost delivered by the conveyor.

37 Claims, 8 Drawing Sheets

MUSHROOM COMPOST COMPACTING ASSEMBLY

CROSS-REFERENCE TO RELATES APPLICATION

This application is a continuation-in-part of U.S. Ser. No. 10/262,752, filed Oct. 2, 2002 now abandoned.

BACKGROUND OF THE INVENTION

The growing of mushrooms includes various phases which utilize compost to facilitate the mushroom growth in mushroom houses. Various types of mushroom houses are known. A typical, mushroom house might include side by side sets of vertically spaced mushroom beds. Manual labor is required to aid in applying the compost to the mushroom beds in a proper manner. It would be desirable if mushroom compost could be compacted and applied in an efficient and cost saving manner.

SUMMARY OF THE INVENTION

An object of this invention is to provide a mushroom compost compacting assembly which could be used in mushroom houses.

A further object of this invention is to provide such an assembly wherein the compost is compacted and fed into the mushroom beds in an efficient and cost savings manner.

In accordance with this invention a mushroom compost compacting assembly includes a feed hopper unit, a mixer unit, a conveyor unit and a compacter unit. All of these units are separate and distinct from each other, but detachably connected together in such a manner that there is flow communication from the feed hopper unit to the mixer unit and then from the mixer unit to both the conveyor unit and the compactor unit. The conveyor unit and compactor unit include discharge structure so that the compost fed into the assembly can be discharged to a mushroom bed.

The mixer unit may include a pair of parallel shafts having inclined tines for spreading the compost fed from the hopper unit. Part of the compost would then drop into the conveyor unit and later be discharged directly on a bed. Another part of the compost would be fed to the compactor unit. The compactor unit includes a plurality of drums each of which has longitudinal ridges spaced about its periphery for compacting the compost. The compacted compost is then fed into the bed on top of the compost fed by the conveyor unit.

In a preferred practice of the invention the compost is supplied to the compacting assembly from a conveyor located outside of the mushroom house directly to an opening in the, roof of the mushroom house. The compost is then discharged through the roof opening into a chute which communicates with the feed hopper unit. The compost compacting assembly is preferably connected to a lifting unit which is capable of shifting, lifting and lowering the assembly so that the assembly may be selectively disposed adjacent to different mushroom growing beds.

DETAILED DESCRIPTION

Figure 1:
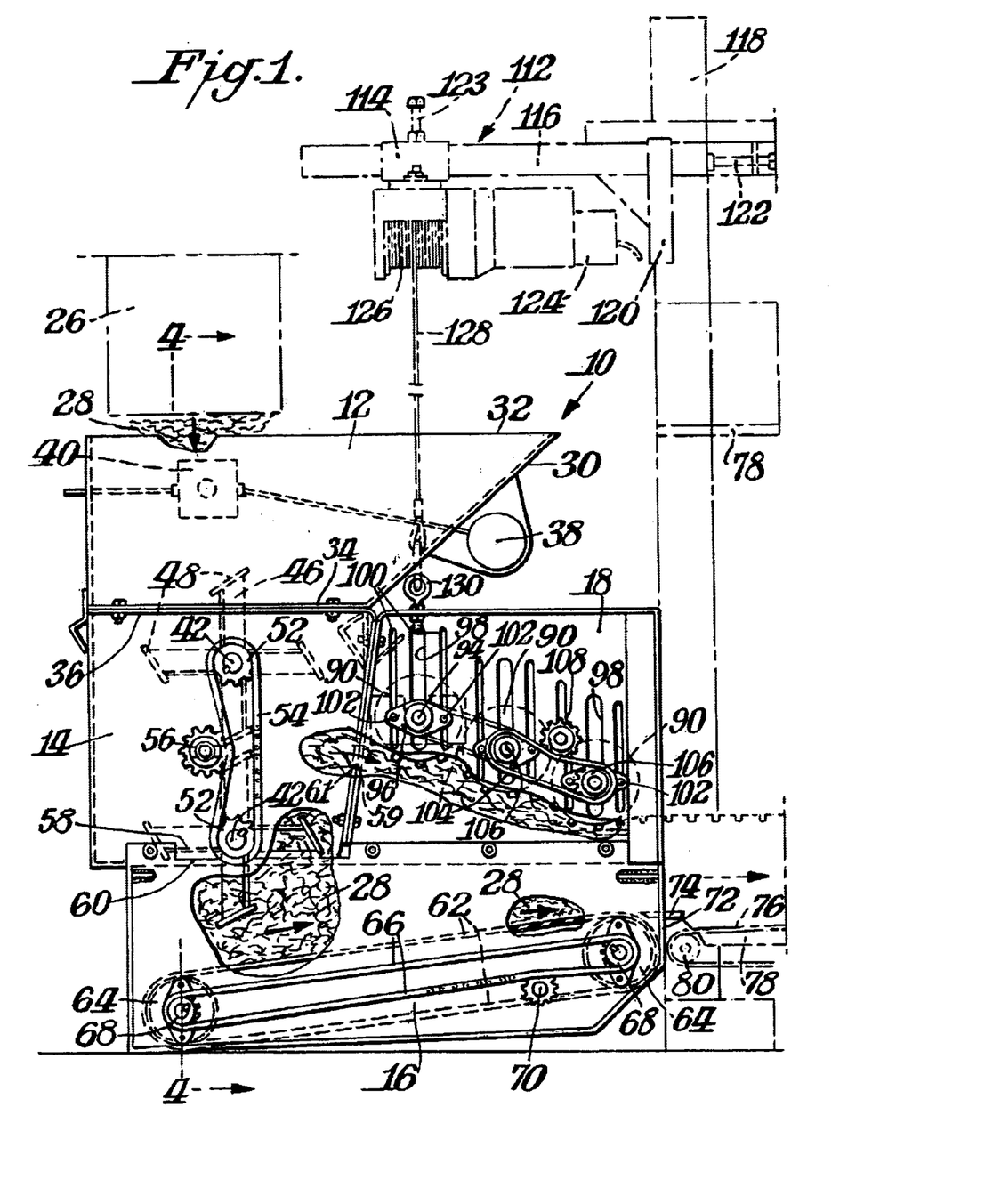
FIG. 1 is a side elevational view of a mushroom compost compacting assembly in accordance with this invention.
Figures 6, 8, 9:
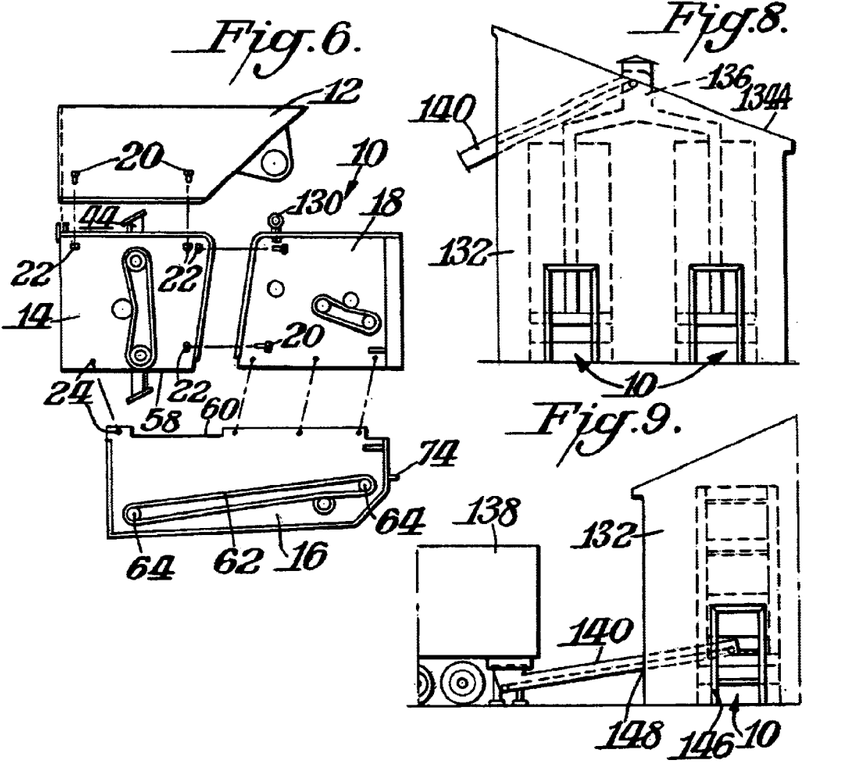
FIG. 6 is an exploded view of the individual units forming the assembly of FIGS. 1–5.
FIGS. 8–12 are schematic side elevational views of alternative compost delivery arrangements which could be usable with the mushroom compost compacting assembly of FIGS. 1–6.

FIG. 1 illustrates a mushroom compost compacting assembly 10 in accordance with this invention. As shown therein assembly 10 includes a number of individual units. These units comprise a feed hopper unit 12, a mixer unit 14, a conveyor unit 16 and a compactor unit 18. As shown in FIG. 6 the four units 12, 14, 16, and 18 are manufactured as chambers or housings which are separate and distinct from each other. When the assembly is to be used, however, the units are then detachably connected together. FIG. 6, for example, shows the use of any suitable fasteners 20 and fastener connectors 22, such as bolts and nuts which could function for such detachable connection by inserting the bolts through appropriate holes 24 in the units. Other detachable fastening structure may also be used.

The feature of forming the assembly by having, separate individual units is a particular advantage of the present invention. In this regard, the assembly itself could weigh about 400 pounds empty or 800 pounds when containing compost. If the units were permanently secured together it would be difficult to maneuver the units. By having four separate units the individual units could be readily moved to the site of use and then easily assembled together. The detachability of the units has the added advantage that an entire unit could be replaced by a similar unit when it is desired to repair or replace a unit or its components. This replacement would occur with minimum down time.

Mushroom compost would be fed to assembly 10 in any suitable manner such as from a chute 26 as shown in FIG. 1 which permits the compost 28 to fall into the hopper of hopper unit 12. Hopper unit 12 may be of any suitable construction. As illustrated, hopper unit 12 includes an inclined side wall 30 and a top wall 32 which may be completely open or at least open over a sufficient area to be in flow communication with chute 26. The bottom 34 of hopper unit 12 is also completely or sufficiently open to be in flow communication with the open portion of the top 36 of mixer unit 14. Hopper unit 12 may also include a vibrator 38 to facilitate, the movement of the compost through the hopper. As illustrated a vibrator speed control mechanism 40 is also provided in feed hopper unit 12.

Figure 3:
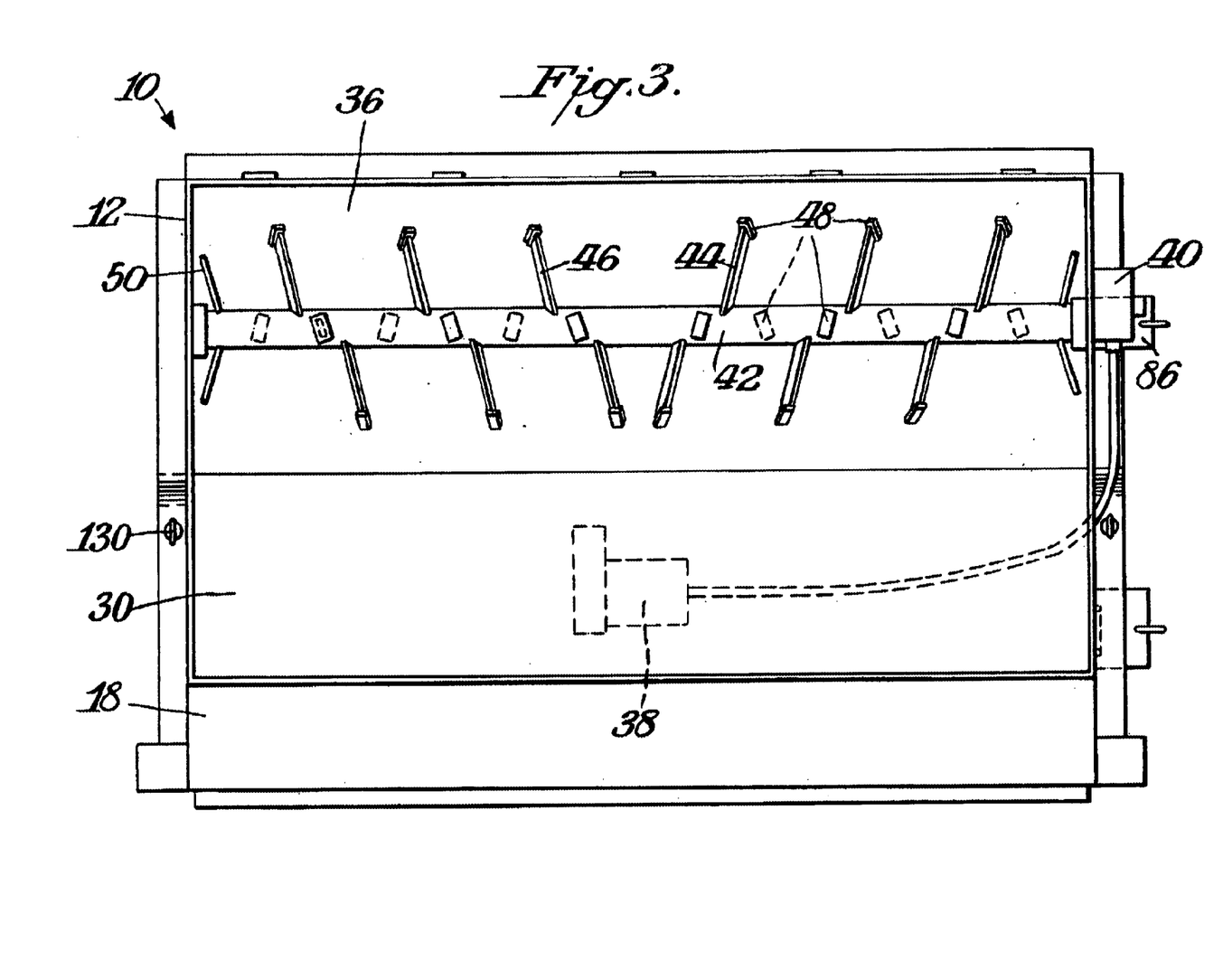
FIG. 3 is a top plan view of the assembly shown in FIGS. 1–2.
Figure 4:
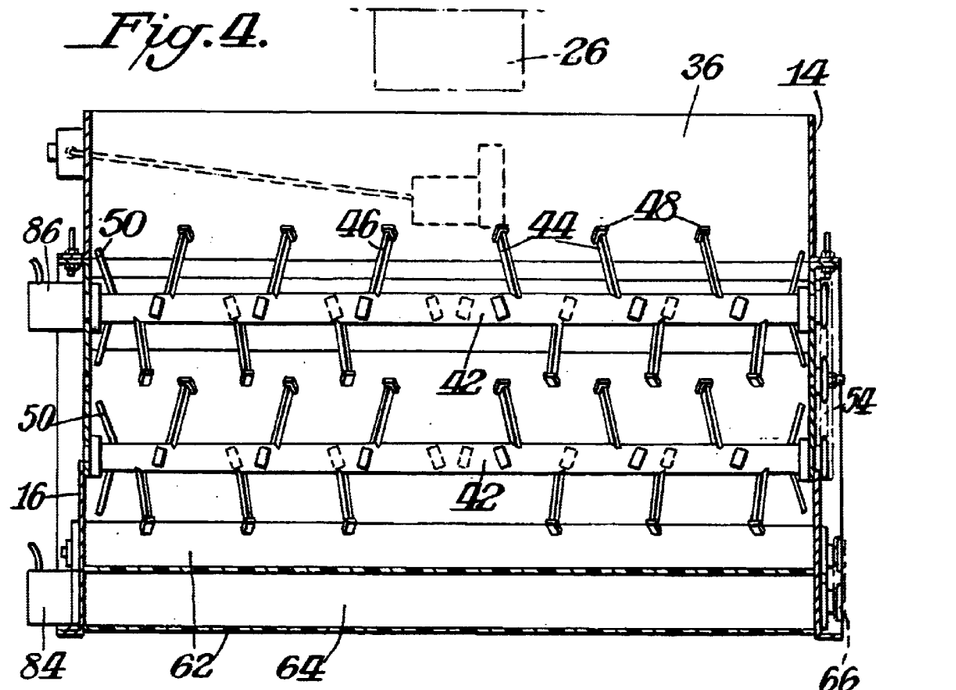
FIG. 4 is a cross-sectional view taken through FIG. 1 along the line 4—4.

The details of mixer unit 14 are best shown in FIGS. 1, 3 and 4. As shown therein a plurality, and preferably two, shafts 42,42 are mounted across mixer unit 14. Each shaft includes two sets of spreading tines 44, 46 on each side of the longitudinal center of its shaft 42. The individual tines 44,46, are angled in a direction toward the longitudinal center of its respective shaft. Each tine includes a shoe 48 transversely secured to the end of each of the tines 44,46. These angled tines function to spread the compost received through the open top 36 laterally across the mixer chamber 14. Each shaft 42 also includes at each end angled tines 50 directed toward the side walls of mixer unit 14 to keep the bearings for the shafts 42 free of accumulation of compost material. Any suitable number of tines 44,46,50 may be located around the circumference of shaft 42. As illustrated in FIG. 4 the tines 44,46 are located 120° apart. Tines 50 are illustrated as being 180° apart. As also illustrated in FIG. 4 the upper shaft 42 and lower shaft 42 are spaced apart and with their tines staggered with respect to each other so that the tines on each shaft may rotate at least slightly into the spacing between the tines on the other of the shafts. FIG. 4 further illustrates the tines 44,46 to be not only angled with respect of the longitudinal axis of the shafts 42, but also in a slightly twisted orientation with regard to the outer surface of the shafts.

The shafts 42,42 could be driven jointly in any suitable manner. FIG. 1, for example, illustrates each shaft to include an externally mounted sprocket 52. The sprockets are interconnected by a chain drive 54. The proper tension is achieved through adjustably mounted idler sprocket 56. One of, the sprockets 52 could be driven by a suitably mounted motor to drive the other sprocket 52 for joint movement of both shafts 42,42.

As shown in FIGS 1 and 4 the ends of the tines 44,46 are such that the tines on upper shaft 42 would rotate through the open top 36 of mixer unit 14 and into the open bottom 34 of feed hopper unit 12 to assist in removing the compost from the feed hopper unit and delivering it into the mixer unit. Because the tines actually extend into the hopper, the compost (manure) is spread and is chewed up to maximize the compacting action. Similarly, the rotating tines 44,46 would extend through the open bottom 58 of mixer unit 14 and into the open area 60 of the top of conveyor unit 16 to deliver compost from the mixer unit into the conveyor unit. See FIG. 1. As also illustrated in FIGS. 1 and 5 mixer unit 14 has an open area in its side wall 61 which communicates with an open area 59 in the side wall of compactor unit 18, so that compost, is delivered from mixer unit 14 into compactor unit 18.

Figure 5:
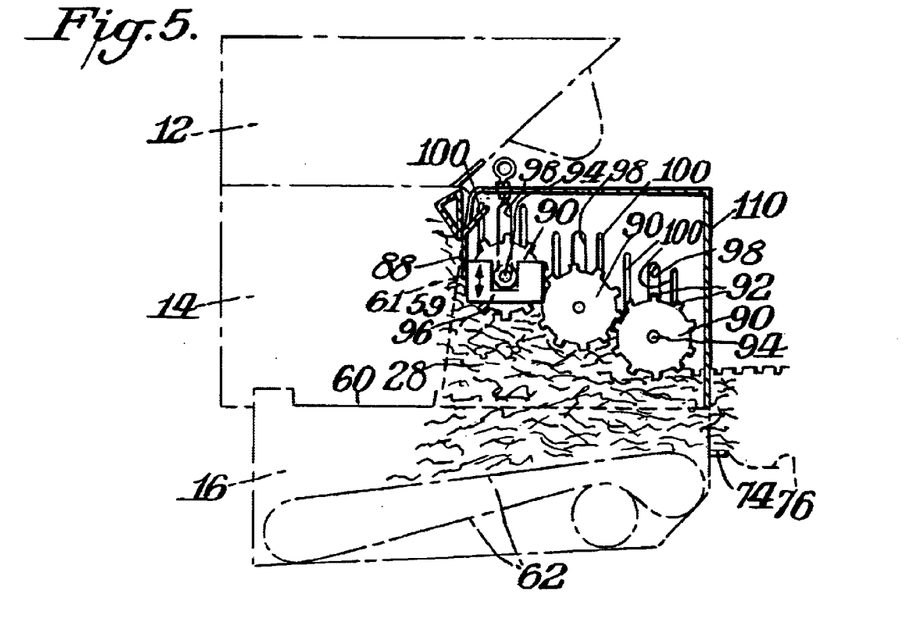
FIG. 5 is a cross-sectional view in elevational particularly showing the compacting unit.

The details of conveyor unit 16 are best shown in FIGS. 1, 5 and 6. As shown therein conveyor unit 16 is located below mixer unit 14 and compactor unit 18. In the preferred practice of the invention conveyor unit 16 is detachably secured to both mixer unit 14 and compactor unit 18. The invention could, however, be practiced where the conveyor unit is secured to only one of the mixer unit 14 or compactor unit 18. Since communication is not intended directly between conveyor unit 16 and compactor unit 18, one or both of those units has a solid wall to prevent flow communication between the units. As noted, however, at least a portion of the top of conveyor unit 16 has an open area 60 to create communication with mixer unit 14 through its open bottom 58. As shown in FIG. 1, conveyor unit 16 includes an upwardly inclined conveyor belt 62 mounted around shafts 64,64. Shafts 64,64 are rotatably connected by a chain 66 secured over sprockets 68,68. A movably mounted tensioning sprocket 70 is disposed against chain 66 to provide the desired tension. The sprockets 68,68 may be driven in any suitable manner such as by a motor. The discharge end or wall of conveyor unit 16 has an open area 72 for conveying and depositing compost 28 over bridge plate 74 directly onto bed netting 76 which is also a form of conveyor to move the compost across the mushroom bed 78 in a known manner wherein the bed netting is driven over roller 80.

Figure 2:
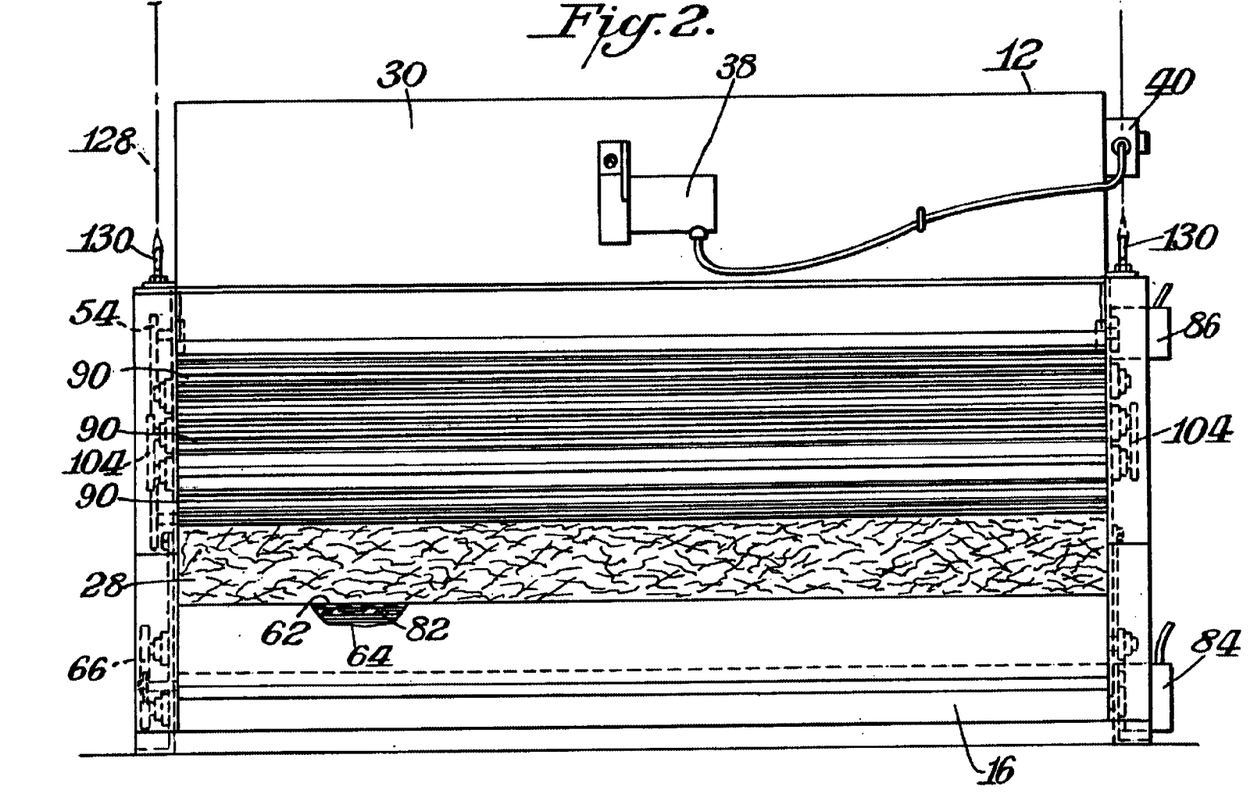
FIG. 2 is a front elevational-view of the assembly shown in FIG. 1.

As shown in FIG. 2 the conveyor belt 62 includes a rubber traction sleeve 82 with a patterned surface. FIG. 2 also illustrates the motor drive 84 for driving conveyor rollers 64. In addition FIG. 2 illustrates the motor drive 86 for driving the compost spreading shafts 42 in mixer unit 14.

The compost discharged from mixer unit 14 into compactor unit 18 is fed through the open areas 59,61 of the adjacent side walls of both units as previously described. Compactor unit 18 includes a movable flow control mechanism having a doctor blade 88 adjacent to the open area 59 of compactor unit 18. See FIG. 5. Doctor blade 88 is movable vertically to assure that the compost 28 being fed into compactor unit 18 is directed toward the lower portion of the compactor drums 90,90,90 as shown in FIG. 5. As illustrated therein a plurality of, and in the illustrated embodiment three, compactor drums are mounted across compactor unit 18. The drums 90 are mounted parallel to each other and parallel to shafts 42. See FIG. 1. The drums are mounted in a descending order toward the discharge end of compactor unit 18 with the axis of rotation of the three drums being in alignment with each other in a downwardly extending plane.

As shown in FIG. 5 each drum 90 is provided with a series of equally spaced parallel ribs 92 on its outer periphery. The ribs 92 of each drum intermesh with the ribs 92 of its adjacent drum so that the compost 28 is effectively compacted while in compactor unit 18.

Compactor unit 18 includes a plurality of slots or tracks 98 in its opposed walls for accommodating the shafts 94 of each drum. This permits each drum to be vertically adjusted. The manner of adjustment is readily apparent from FIGS. 1 and 5. As shown in FIG. 1 a bearing block 96 is provided for the shaft 94 of the uppermost compactor roller 90. Bearing, block 96 moves in its slot 98. A pair of guide slots 100 are provided on each side of each slot 98 for association with pins 102 of bearing block 96 so that the uppermost compactor roller 90 may be moved vertically up or down. See FIG. 1. As shown in FIG. 5 the doctor blade mechanism 88 is secured to the upper bearing block 96 for joint movement to assure maintaining the proper vertical location of doctor blade 88 which would be about horizontally in line with the shaft 94 of upper compactor drum 90. Similar guide slots 98,100 would be provided for the remaining two compactor rollers which also would have their bearing blocks and pins. As shown in FIG. 1 the compactor drums 90 are connected for joint rotation by drive chain 104 extending over sprockets 106. A tension sprocket 108 may also be provided. The same motor 86 which drives spreader shafts 42 may be utilized for driving compactor drums 90.

As best shown in FIG. 5 the compacted compost 28 is fed through an open portion of side wall 110 of compactor unit 18 to deposit the compacted compost on the mushroom bed directly on top of the compost which had been deposited from conveyor unit 16.

A lifting mechanism is also provided to raise and lower assembly 10 and to shift assembly 10 in a lateral direction for proper positioning against each selective mushroom bed. As shown, in FIG. 1 the lifting assembly 112 includes a sleeve 114 mounted on a transverse arm 116 connected to the post 118 for the mushroom beds. A U-shaped vertical support plate 120 extends partially around post 118 and is mounted to transverse arm 116. The lifting mechanism also includes a suitable clamping arrangement 122 for pressing against post 118 on the opposite side of support plate 120. Sleeve 114 would be moved to its desired position and then held firmly in place on arm 116 by any suitable locking or clamping mechanism such as lock bolt 123.

The lifting mechanism includes a winch which in turn includes a motor 124 for rotating winch take-up drum 126 for raising and lowering cable 128. Cable 128 is secured to assembly 10 in any suitable manner and in any suitable location. As shown in FIG. 1 the manner and location of securement is by means of an eye 130 mounted to compactor unit 18. Thus, by activation of the winch the assembly 10 can be moved up or down in proper position with respect to each of the beds 78. Chute 26 would also be vertically adjustable in length such as by being of telescopic construction to be of an extended length when assembly 10 is adjacent to the lowest most bed or of a contracted length when assembly 10 is adjacent to the uppermost bed. In practice assembly 10 would be first disposed adjacent to the lowermost bed and then periodically raised to the next higher bed.

Figure 7:
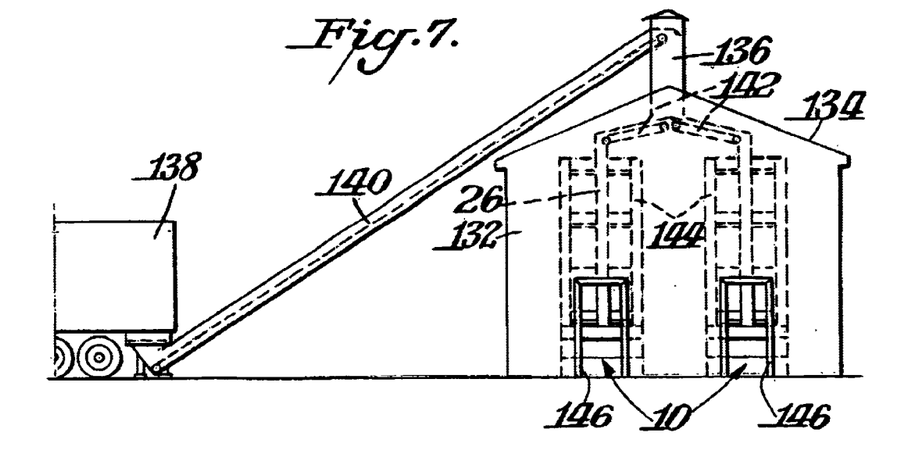
FIG. 7 is a schematic side elevational: view showing the delivery of compost to a mushroom house which utilizes the mushroom, compost compacting assembly, of FIGS. 1–6.

FIGS. 7-11 show various manners of feeding the compost from an external location to the chute 26 within the mushroom house 132. FIG. 7 illustrates a preferred practice of the invention wherein the mushroom house 132 has a roof 134 with an opening in the roof in the form of a delivery chute 136. The roof 134, of FIG. 7 is a gable roof having a pair of inclined roof portions. A conventional vehicle or truck 138 would be located externally of house 132 for delivering compost through a compost conveyor chute 140 which extends to the delivery chute 136 on roof 134. The compost would then be discharged through delivery chute 136 into one or more conveyor chutes 142 with a conveyor chute being provided for the vertical chute 126 of each assembly 10. Thus, for example, a separate compactor assembly 10 could be provided for each set of vertical beds 144. FIG. 7 also shows the door frames 146 for the mushroom house 132.

FIG. 8 shows a variation where the mushroom house 132 has a single inclined roof 134A but where the compost is otherwise delivered in the same manner as in FIG. 7.

FIG. 9 illustrates a variation of compost delivery wherein the compost is fed directly through an opening 148 in the side wall of the house 132 to the assembly 10.

Figure 10:
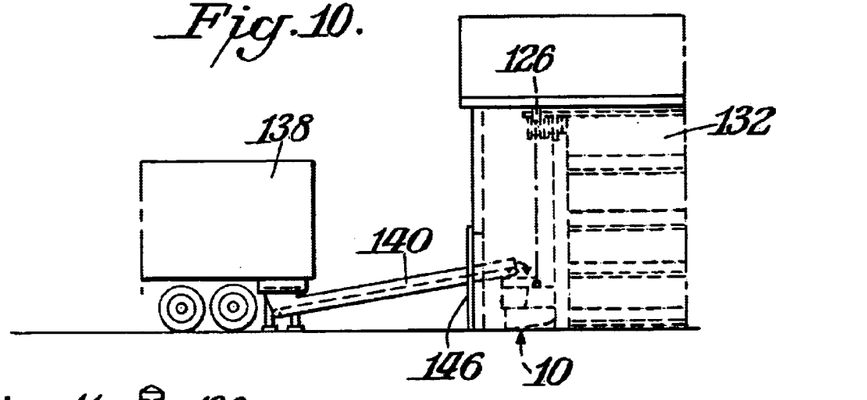

FIG. 10 shows yet another variation where the conveyor 140 enters the house 132 through the doorway 146.

Figures 11, 12:
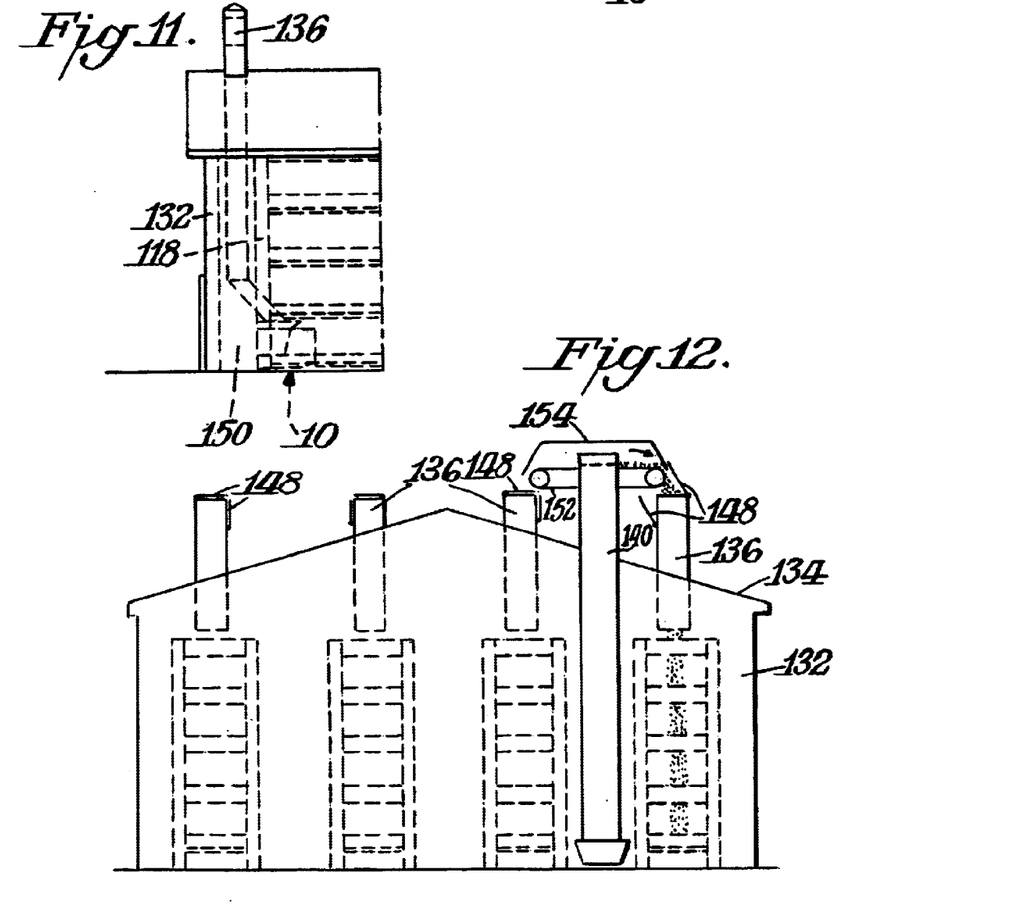

FIG. 11 shows yet another variation wherein the house 132 is modified where there are tight space requirements to accommodate the compactor assembly 10. As shown therein, the compactor assembly 10 would be inserted within the mushroom bed's frame by removal of some of the floor boards of the beds where the spacing 150 between the mushroom house outer wall and the mushroom bed frame post 118 is not sufficiently wide to assemble the units of the compactor assembly 10. In the arrangement shown in FIG. 11 the compost would be fed externally of house 132 to delivery chute 136 in the manner previously described.

FIG. 12 shows yet another variation which is a preferred practice of this invention wherein the house 132 includes a plurality of delivery chutes or chimneys 136 extending through the roof 134. All of the chimneys would terminate at generally the same height which would mean that where the roof 134 is tapered some of the chimneys would extend a great distance from the roof. The compost conveyor chute 140 would be positioned between a pair of chimneys 136 as illustrated. Each chimney or delivery chute 136 could be selectively opened at its top to received the compost. In the illustrated embodiment a pair of flaps or panels is provided one of which would form the top of chimney 136 while the other would be on the side wall extending to the top. Each panel 148 is pivotally mounted to be selectively moved to the opened and closed position. FIG. 12 shows the chimney 136 at the right-hand most side of house 132 to have its panels 148 hinged to the open position.

Compost conveyor chute 140 would be positioned so as to deliver the compost into the chimneys. This could be done in any suitable manner. FIG. 12, for example, shows the top of delivery chute 140 to deposit the compost onto the distributing conveyor 152. Each end of the distributing conveyor 152 would be located directly above one of the two adjacent chimneys 136. By controlling the direction of movement of the conveyors and particularly the delivery conveyor 152 the compost would be selectively deposited into either the right side chimney or the left side chimney. FIG. 12 shows-the compost being dropped into the right side chimney having the open panels 148. When sufficient compost has been delivered the direction of movement of conveyor 152 would be reversed and the panels 148 on the second chimney would be opened so as to permit the compost to then be delivered into that chimney. Once sufficient compost has been delivered the compost conveyor chute 140 would be moved to the next set of adjacent chimneys shown in left-hand portion of FIG. 12. The upper end of conveyor chute 140 and the conveyor 152 are preferably covered with a shield 154 which could be mounted in any suitable manner to conveyor chute 140 so that the shield 154 is part of the delivery assembly.

Figure 13:
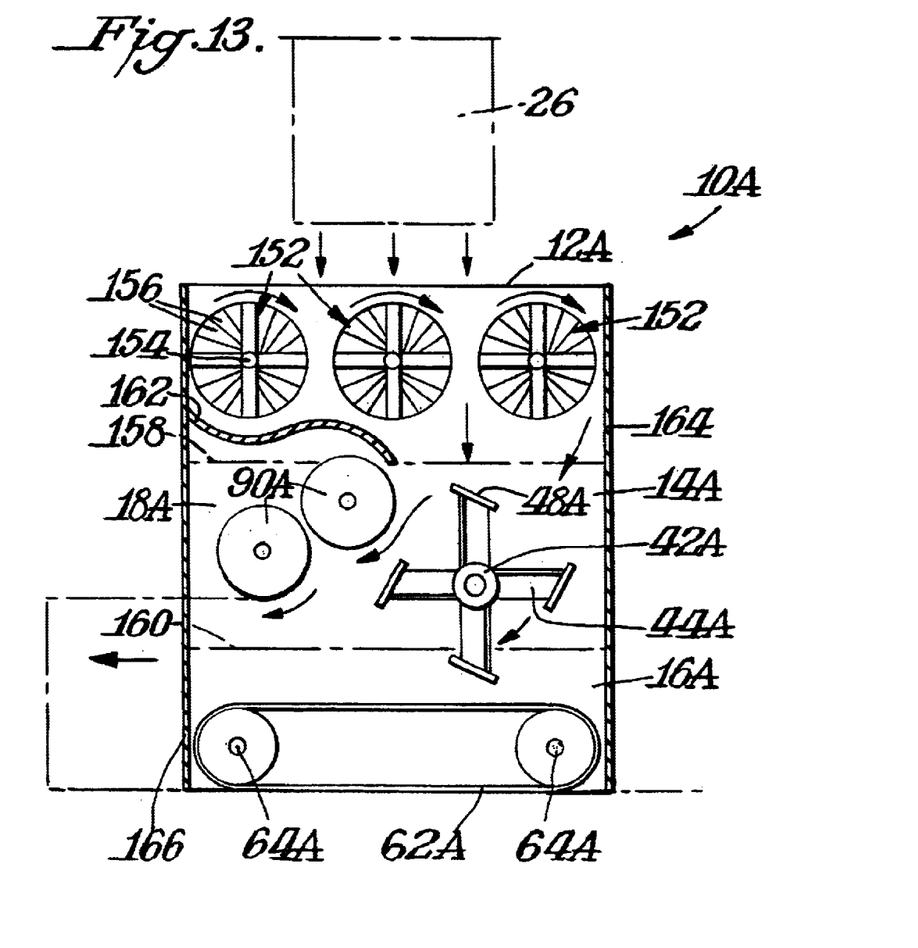
FIG. 13 is a cross-sectional side elevational view of a modified mushroom compost compacting assembly in accordance with this invention.
Figure 14:
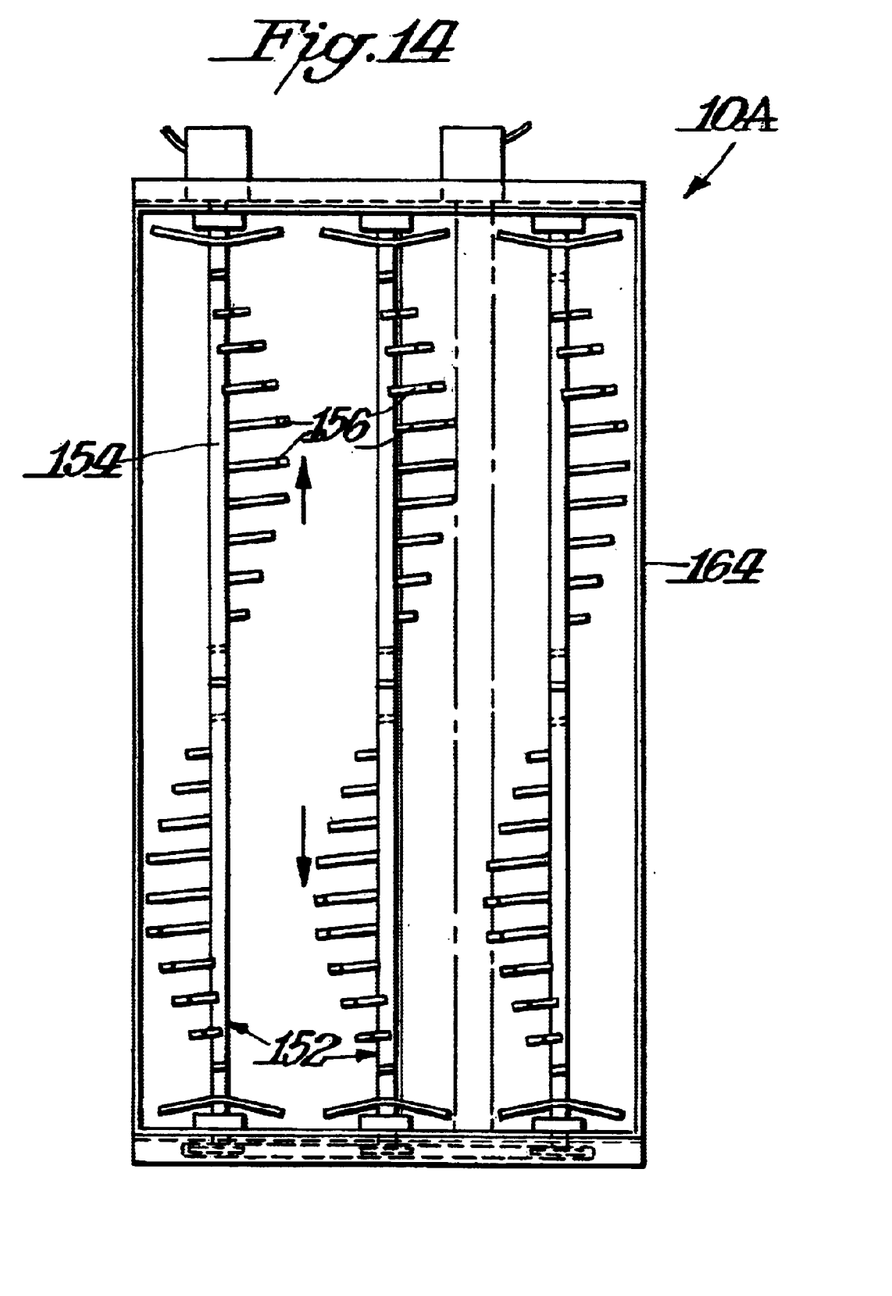
FIG. 14 is a top plan view of the assembly shown in FIG. 13.

FIGS. 13-14 show an assembly 10A which is a variation of assembly 10 of FIGS. 1-6. Assembly 10A would be more compact and essentially more simplified than assembly 10. For example, in practice assembly 10 might have a width of 40 inches whereas assembly 10A would be about 32 inches wide. The smaller width takes up less bed space. Assembly 10A could also be used with the delivery arrangements shown and described with respect to FIGS. 7-12.

As shown in FIG. 13 assembly 10A includes a modified hopper 12A which includes a plurality of, and preferably three, breakers for receiving the compost fed by chute 26. Each breaker 152 is in the form of a rotatable shaft 154 having a plurality of tines 156 extending outwardly from the shaft 154. The breakers are laterally aligned across hopper unit 12A. As shown in FIG. 14 the tines, 156 vary in length or extension so as to form a sinusoidal or serpentine pattern wherein the tines 156 closest to the end of each shaft are the shortest tines, while the tines progressively increase in size to a position about ¼ the length of shaft 154. The tines 156 then progressively decrease in size until the tines approach the mid-point of each shaft. In the general area of the half-way of midpoint of each shaft there could preferably be small tines or less preferably no tines at all. The tines then increase in length to about ¾ the length of each shaft 154: and then decrease in length to the end of each shaft.

As best shown in FIG. 14 the tines 1560 on shaft 154 are disposed at an angle slightly less than being perpendicular to the shaft. As also illustrated the angles are such that each tine is angled away from the center of each shaft. Thus, the tines on one-half of each shaft form mirror images of the tines on the other half of that shaft. By having the tines 156 inclined away from the center of each shaft 154 the compost is moved from the center of the shaft outwardly toward the end of the shaft. The tines 156 are preferably equally spaced apart by a distance of two inches with the length differential of adjacent tines being about ¼ inch to for the, sinusoidal or serpentine pattern. This causes the tines 156 to break into the compost at various depths. Preferably each shaft 156 has 23 tines. The tines extend in a continuous sinusoidal pattern along the entire length of each shaft 154.

By providing the breakers 152 in hopper unit 12A the compost is forced to move toward the discharge end of hopper unit 12A which is toward the right as shown in FIG. 13 as clearly indicated by the arrows.

Assembly 10A also includes, a mixing unit 14A located to receive the compost delivered from hopper unit 12A. After mixing, the compost is delivered to compactor unit 18A and then to conveyor unit 16A where the compost is discharged from the housing 164 for the four units as previously described for assembly 10.

One advantage of assembly 10A is that the four units need not be separate and distinct from each other and could be housed in a single housing without separate partitions. If desired however, a partition 158 which is shown in phantom in FIG. 13 may separate hopper unit 12A from the combined mixer unit 14A and compactor unit 18A. Similarly a partition 160 (shown in phantom) may separate conveyor, unit 16A from the combined unit comprising mixer unit 14A and compactor 18A. Although not illustrated, a partition may also separate units 14A and 18A. Each partition 158 and 160 would, of course, include adjoining walls of the adjacent units. Thus, for example, partition 158 would include the lower wall of hopper unit 12A and the upper wall of combined mixer unit 14A and compactor unit 18A. Similarly, partition 160 would include the upper wall of combined mixer unit 14A and compactor unit 18A with the upper wall of conveyor unit 16A. Preferably, however, there are no partitions separating the four units.

Where partitions such as partitions 158 and 160 are provided in housing 164 the various units may be separate and distinct from each other, although preferably the mixer unit 14A and compactor 18A would be included as a combined unit. As a result it is possible to detachably connect the units together wherein there could be three separate units comprising the hopper unit 12A as one separate unit, the conveyor unit 16A as one separate unit and the combined mixer unit 14A and compactor unit 18A as a third separate combined unit. Alternatively, the housing may be, separated into two detached sections wherein either the hopper unit 12A or the conveyor unit 16A is maintained assembled to the intermediate combined mixer unit 14A and compactor unit 18A.

In the preferred practice of the invention illustrated in FIG. 13, a shield 162 is located below the breakers 152 on the upstream side of hopper unit 12A to prevent compost from falling directly into compactor unit. 18A thereby assuring that the compost is directed from hopper unit 12A into mixer unit 14A. As illustrated shield 162 is generally of S-shape so that it conforms to the rotating breakers 152 and then also conforms to the uppermost compactor drum 90A. Shield 162 extends laterally across the housing 164 a distance of at least the lateral dimension of the compactor unit 18A, but not so far laterally into the housing 164 to interfere with compost being delivered to spreader shaft 142A in mixer unit 14A. Shield 162 thereby assures that the compost will not be dropped directly into the compactor unit 18A and its drums 90A.

The mixer unit 14A would operate generally along the same lines as mixer unit 14 in that it includes a spreader shaft 42A with inclined tines such as tines 44 and 46 of unit 14. FIG. 13 illustrates one set of tines 44A. Each tine is provided with a shoe 48A at its outer end as previously described. Mixer unit 14A would include a pair of spreader shafts 42A similar to what is illustrated in FIG. 4 with regard to mixer unit 14. Preferably each spreader shaft would include 24 tines, with each of the tines angled toward the center of its shaft, as previously described with respect to mixer unit 14.

The compost which is mixed in mixer unit 14A is then delivered to compactor unit 18A where drums 90A compact the compost in the manner described with regard to compactor unit 18. Drums 90A are laterally and longitudinally displaced from each other as in compactor unit 18. Unlike compactor unit 18, however, compactor unit 18A includes only two compacting drums 90A rather than three drums.

After the compost has been compacted it is deposited on conveyor belt 62A in conveyor unit 16A. Conveyor belt 62A rotates about rollers mounted on shafts 64A. The conveyor unit 16A is generally similar to conveyor unit 16 except that the conveyor belt 62A on its upper and lower runs is disposed in a horizontal, rather than an inclined, orientation. The compacted compost is then fed through opening 166 in housing 164 for later use as previously described. It is to be understood that various features in assembly 10 could be included in assembly 10A and similarly features in assembly 10A could be included in assembly 10.

Housing 164 thus includes an upper end and a lower end with an intermediate portion between the upper end and the lower end. The hopper unit 12A is located in the upper end while the conveyor unit 16A is located in the lower end. Both the mixer unit 14A and the compactor unit 18A are located in the intermediate portion between the hopper unit and the conveyor unit. The four units in the single housing are in free communication with each other except for the shield 162 separating the compactor unit 18A from the hopper unit 12A directly above it.

As should be apparent the present invention provides techniques for effectively compacting mushroom compost and delivering the compost to the mushroom growing beds in a simple and cost savings manner.

What is claimed is:

1. A mushroom compost compacting assembly comprising a feed hopper unit, a mixer unit, a conveyor unit, a compactor unit, said units being separate and distinct from each other, said feed hopper unit being detachably connected to and communicating with said mixer unit to feed compost from said feed hopper unit to said mixer unit, said mixer unit being detachably connected to and communicating with said conveyor unit and said, compactor unit to feed compost from said mixer unit to said conveyor unit and to said compactor unit, said mixer unit including at least one rotatable shaft extending across said mixer unit, a plurality of spaced tines on said shaft for spreading the compost received from said feed hopper unit, said feed hopper unit having a bottom, said mixer unit having a top, at least a portion of said feed hopper bottom being open, at least a portion of said mixer unit top being open and being in flow communication with said open portion of said mixer unit, said mixer unit having a bottom, said conveyor unit having a top, a conveyor in said conveyor unit located, below said mixer unit and below said compactor unit, said conveyor having a receiving end below said mixer unit and a discharge end below said compactor unit, said top of said conveyor unit being open above said receiving end of said conveyor, said bottom of said mixer unit being open and in flow communication with said open top of said conveyor unit above said receiving end of said conveyor unit, a side wall at said discharge end of said conveyor for discharging compost from said conveyor unit, said mixer unit having an-outlet side located at said compactor unit, said compactor unit having an inlet side located at said mixer unit, said mixer unit outlet side and said compactor unit inlet side being open and in flow communication, a plurality of parallel compactor drums in said compactor unit, each of said compactor drums having a plurality of spaced parallel longitudinal ribs-on its outer surface for compacting compost received from said mixer unit, said compactor unit having a discharge side remote from said inlet side, and a discharge opening in said discharge side for discharging compacted compost from compactor unit on top of the compost discharged from said conveyor unit.

2. The assembly of claim 1 wherein said conveyor unit is detachably connected to said compactor unit.

3. The assembly of claim 1 including a lifting assembly for selectively raising and lowering said connected units.

4. The assembly of claim 1 wherein a pair of said shafts are in said mixer unit, said shafts being parallel with each other, said shafts being an upper shaft and a lower shaft, and a common drive rotating said shafts.

5. The assembly of claim 4 wherein said tines on said upper shaft rotatably extend into said feed hopper unit through said mixer unit open top portion and said feed hopper unit open bottom portion, and said tines on said lower shaft rotatably extending into said conveyor unit through said mixer unit open bottom and said conveyor unit open top.

6. The assembly of claim 5 wherein each of said shafts has a longitudinal center, and said tines on each of said shafts including a set of tines on each side of said longitudinal center, angled toward said longitudinal center.

7. The assembly of claim 6 wherein a shoe is transversely secured across the free end of each of said tines in said sets of tines.

8. The assembly of claim 7 wherein each of said shafts includes end tines at its ends angled away from said longitudinal center.

9. The assembly of claim 8 wherein each of said tines in said sets of tines is mounted to its shaft at a slight twist.

10. The assembly of claim 6 wherein said tines on said shafts are spaced apart and staggered with respect to each other whereby said tines on each of said shafts may rotate into the spacing between said tines on the other of said shafts.

11. The assembly of claim 1 wherein said conveyor is inclined upwardly from said receiving end to said discharge end.

12. The assembly of claim 1 including a bridge plate mounted to and outwardly of said conveyor unit.

13. The assembly of claim 1 wherein said ribs on said drums intermesh.

14. The assembly of claim 13 wherein said drums include a drum adjacent to said discharge side of said compactor unit which is the lowest of said drums.

15. The assembly of claim 14 wherein said drums include at least three parallel drums, and the axis of rotation of said drums being aligned along line extending downwardly toward said discharge side of said compactor unit.

16. The assembly of claim 15 wherein each of said drums is vertically adjustable.

17. The assembly of claim 15 wherein said drums are parallel to said mixer unit shaft.

18. The assembly of claim 14 wherein said drums have a common drive.

19. The assembly of claim 1 including a doctor blade at said inlet side of said compactor unit.

20. The assembly of claim 1 wherein said tines extend into said feed hopper unit.

21. The assembly of claim 1, in combination with a mushroom house, said mushroom house having a roof, a plurality of vertically disposed mushroom beds in said house, a feed opening in said roof, a feed conveyor externally of said house leading to said roof feed opening, a chute in said house, said chute being adjustable in length, said compost compacting assembly being in said house disposed adjacent to one of said beds, a lifting assembly connected to said compost compacting assembly for raising and lowering said compost compacting assembly to be selectively disposed adjacent to different of said beds, and said chute being in flow communication with said feed hopper unit.

22. The assembly of claim 21 wherein a chimney extends through said feed opening in said roof, said chimney containing said roof feed opening, a delivery conveyor in flow communication with said feed conveyor and said delivery conveyor being mounted for delivering the compost into said feed opening.

23. The assembly of claim 22 wherein said house contains a plurality of chimneys extending through said roof, said delivery conveyor being of a length to be located for selectively feeding compost to adjacent chimneys, and said delivery conveyor being movable in reverse directions for the selective feeding of compost into said adjacent chimneys.

24. The assembly of claim 23 wherein said feed conveyor is movable to be selectively positioned between different adjacent sets of said chimneys.

25. In a mushroom house having a roof and a plurality of sets of vertically disposed mushroom beds, the improvement being in a compost compacting assembly in said house, said assembly including a hopper in flow communication with a mixer unit and including a conveyor unit and a compactor unit in flow communication with said mixer unit, said assembly being disposed adjacent to one of said beds, said mixer unit having at least one rotatable shaft with compost spreading tines, said conveyor unit being under said mixer unit, a conveyor in said conveyor unit for discharging compost on to said one bed, a plurality of rotatable compacting drums in said compactor unit, said compacting drums discharging compacted compost on said one bed on top of the compost from the conveyor, a lifting mechanism connected to said assembly for selectively disposing said assembly adjacent to different beds, a feed conveyor disposed externally of said house, said roof having an inlet opening, said feed conveyor communicating with said inlet opening, and a supply chute communicating with said inlet opening and with said hopper.

26. The house of claim 25 wherein a chimney extends through said inlet opening in said roof, said chimney containing said roof inlet opening, a delivery conveyor in flow communication with said feed conveyor and said delivery conveyor being mounted for delivering the compost into said inlet opening.

27. The house of claim 26 wherein said house contains a plurality of chimneys extending through said roof, said delivery conveyor being of a length to be located for selectively feeding compost to adjacent chimneys, and said delivery conveyor being movable in reverse directions for the selective feeding of compost into said adjacent chimneys.

28. The house of claim 27 wherein said feed conveyor is movable to be selectively positioned between different adjacent sets of said chimneys.

29. The house of claim 25 wherein said hopper includes a plurality of laterally spaced breakers, each of said breakers comprising a rotatable shaft and a plurality of tines mounted longitudinally across said shaft.

30. The house of claim 29 wherein said breakers are laterally aligned with each other, each of said tines being mounted at an angle inclined away-from the center of its respective shaft, and said tines being equally spaced from each other and of varying length with the outer ends of said tines forming a sinusoidal curve having the smallest length tines located at the ends and at the center of said shaft.

31. The house of claim 25 wherein said feed conveyor is mounted in a horizontal orientation.

32. The house of claim 25 wherein said hopper and said mixer unit and said conveyor unit and said compactor unit are mounted in a single housing, a shield being disposed in said housing between said compactor unit and said hopper to prevent compost from flowing directly from said hopper to said compactor unit, and said hopper and said compactor unit and said mixer unit and said conveyor unit being otherwise in free communication with each other.

33. A mushroom compost compacting assembly comprising a housing having an upper end and a lower end with an intermediate section between said upper end and said lower end, a hopper unit in said upper end of said housing, said hopper unit including a plurality of laterally aligned breakers, each of said breakers including a shaft having a plurality of tines extending longitudinally from and around said shaft, said tines being mounted at a non-perpendicular angle extending away from the center of its respective shaft, said tines being of differing length with the free ends of said tines forming a soniciodal pattern wherein the lowest length tines are located at the ends and at the centers of each shaft, a mixer unit in said intermediate portion of said housing below said hopper unit, said mixer unit including at least one rotatable shaft extending across said mixer unit, a plurality of spaced tines on said mixer unit shaft for spreading the compost received from said hopper unit, a compactor unit in said intermediate section laterally spaced from and adjacent to said mixer unit for receiving the compost from said mixer unit, a shield in said housing disposed between and separating said hopper unit from said compactor unit, said compactor unit having a plurality of spaced compactor drums longitudinally and laterally spaced from each other, a conveyor unit in said lower end of said housing below said mixer unit and said compactor unit for receiving compost, said conveyor unit including a rotatable conveyor belt, an opening in said lower end of said housing for permitting compost to be discharged from said, conveyors belt and out of said housing through said opening, and each of said hopper unit and said mixer unit and said compactor unit and said conveyor unit being in free communication with each other except for said shield which separates said hopper unit from said compactor unit.

34. The assembly of claim 33 wherein said hopper unit includes three of said breakers, and said shield being S-shaped and extending laterally into said housing to a position where said compactor unit and said mixer unit meet.

35. The assembly of claim 34 wherein said tines on said breaker shafts are equally spaced from each other, and said tines on said mixer unit shaft being angled toward the center of said mixer unit shaft.

36. The assembly of claim 35 wherein said plurality of compactor drums in said compactor unit consists of two drums.

37. The assembly of claim 33 wherein said conveyor belt is disposed in a horizontal orientation.

* * * * *